United States Patent [19]

Shitanda et al.

[11] Patent Number: 5,070,601
[45] Date of Patent: Dec. 10, 1991

[54] ELECTRONIC COMPONENT MOUNTING APPARATUS

[75] Inventors: Motoshi Shitanda, Toyonaka; Takao Eguchi, Nishinomiya; Yuji Miyoshi, Neyagawa; Kanji Hata, Katano, all of Japan

[73] Assignee: Matsushita Electric Industrial Co., Ltd., Osaka, Japan

[21] Appl. No.: 586,974

[22] Filed: Sep. 24, 1990

[30] Foreign Application Priority Data

Sep. 26, 1989 [JP] Japan .................................. 1-249554

[51] Int. Cl.⁵ .............................................. B23A 19/00
[52] U.S. Cl. ......................................... 29/740; 29/741
[58] Field of Search ................. 29/740, 741; 74/89.15; 464/179, 180; 248/638

[56] References Cited

U.S. PATENT DOCUMENTS 4,217,766  8/1980  Suckow .................................. 74/574
4,704,792  11/1987  Itagaki et al. .......................... 29/741

FOREIGN PATENT DOCUMENTS 55-118698  9/1980  Japan .

Primary Examiner—P. W. Echols
Attorney, Agent, or Firm—Wenderoth, Lind & Ponack

[57] ABSTRACT

An electronic component mounting apparatus has a movable table on which plural component supply units are arranged in parallel. Each of the component supply units accommodate an electronic component to be mounted on a component mounting member. A guide frame supports the table to move in a direction intersecting perpendicularly to a component supply direction of the component supply unit. A driving shaft is arranged in the direction intersecting perpendicularly to the component supply direction of the component supply unit for moving the table. A positioning device positions the component mounting member. A component mounting device holds the components and mounts the components on the mounting member, and a support member supports the driving shaft at a middle thereof.

5 Claims, 4 Drawing Sheets

1

ELECTRONIC COMPONENT MOUNTING APPARATUS

BACKGROUND OF THE INVENTION

The present invention relates to an electronic component mounting apparatus.

There are well-known electronic component mounting apparatuses for mounting an electronic component on a circuit board. One of the apparatuses is constructed so that plural component supply units for accommodating a plurality of electronic components are arranged in parallel on a movable table, and the table is arranged to be capable of moving in a direction intersecting perpendicularly to a component supply direction of the component supply unit. According to the construction of the apparatus, the component accommodated in any one of the units is taken out at a specified position. A device for positioning a supplied circuit board at a specified position is operated so that a position, whereat a component is to be mounted on the board is located at the specified position. A component mounting device is arranged for holding the component at a component removal position and mounting the component on a specified position of the positioned board.

Referring to FIG. 7, the construction of the above electronic component mounting apparatus will be described hereinafter.

FIG. 7 shows a component supply unit, disclosed in Japanese Laid-open Patent Publication No. 55-118698, for example. A driving motor 44 is fixed to a frame 42 to rotate a ball screw 43 connected to a rotary shaft of the motor 44. The rotation of the motor 44 allows a nut 46 arranged on a movable table 41 for supplying an electronic component to move on the ball screw 43 so that the table 41 moves in parallel to the ball screw 43.

According to the above construction, however, when the number of component cassettes attached to the component supply unit and accommodating the components in order to correspond to various kinds of mounting components is increased, it causes the length of the ball screw to increase and the mounting accuracy and noise of the apparatus to worsen by vibration by deflection of the ball screw itself.

SUMMARY OF THE INVENTION

Accordingly, an essential object of the present invention is to provide an electronic component mounting apparatus capable of preventing vibration by deflection of a driven shaft even though the length of the driven shaft is increased.

Another important object of the present invention is to provide an electronic component mounting apparatus comprising a movable table on which plural component supply units are arranged in parallel. Each of the component supply units accommodates an electronic component to be mounted on a component mounting member. A guide frame supports the table to move in a direction intersecting perpendicularly to a component supply direction of the component supply unit. A driving shaft is arranged in the direction intersecting perpendicularly to the component supply direction of the component supply unit for moving the table. A positioning device positions the component mounting member to mount the components of the units. A component mounting device holding the component and mounting the component on the component mounting member, and a support member supports the driving shaft at a midpoint thereof.

By the above construction of the present invention, the middle of the driving shaft for driving the movable table to mount the component is supported by the support member, resulting in effective prevention of the vibration of the driving shaft.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE EMBODIMENTS

Figure 1:
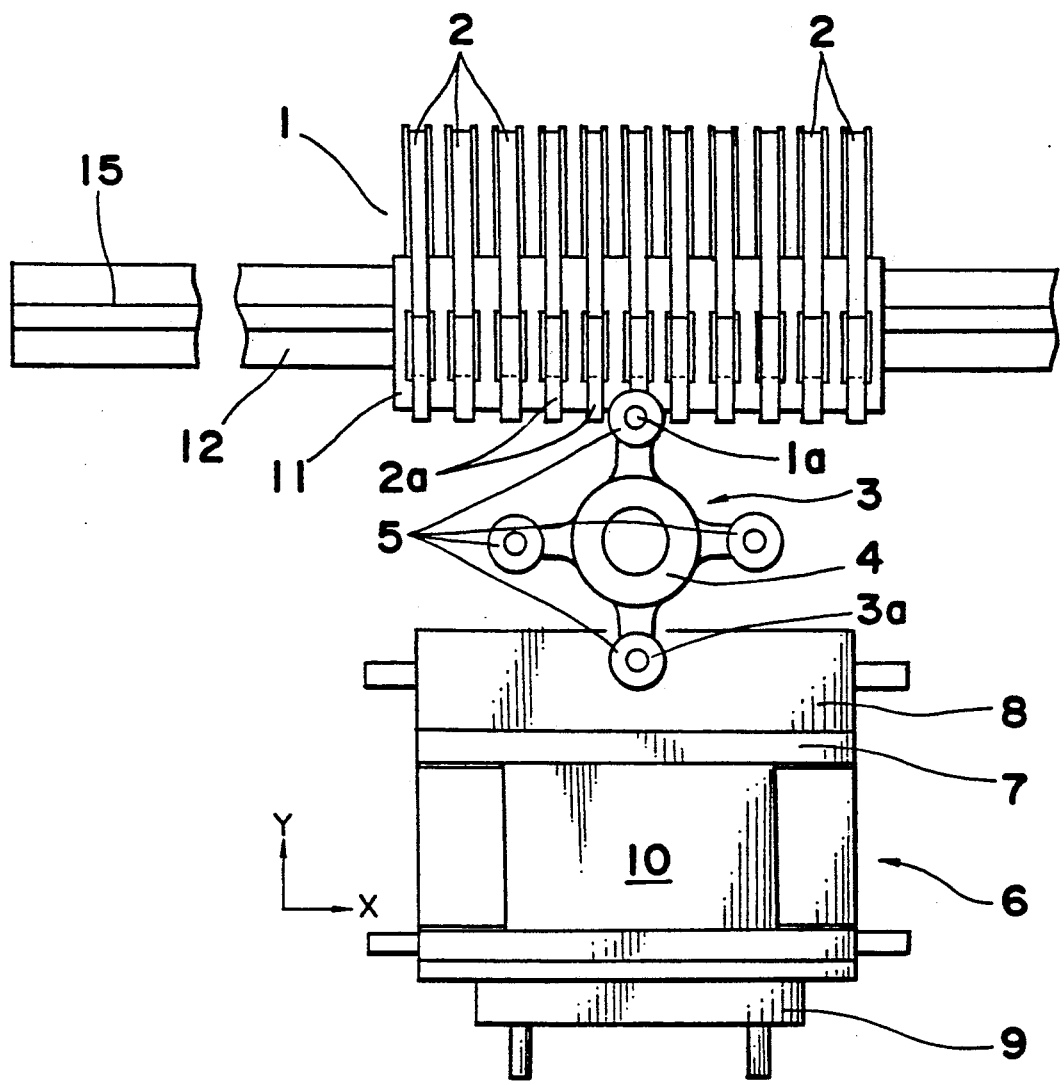
FIG. 1 is a plan view of an electronic component mounting apparatus according to a first embodiment of the present invention.

Before the description of the present invention proceeds, it is to be noted that like components are designated by like reference numerals throughout the accompanying drawings.

An electronic component mounting apparatus according to a first embodiment of the present invention will be described referring to FIGS. 1-4.

In FIG. 1, reference numeral 1 denotes a component supply section in which a number of component supply units 2 are arranged in parallel. Any one of the units 2 is positioned at a specified component supply position 1a. A linear array of the tape-shaped aggregate of many components is mounted on each of the units 2 to be capable of transferring in order the components to a components to a component removal position 2a arranged at one end of the unit 2.

Reference 3 denotes a turnable component mounting unit, in which plural mounting heads 5 are arranged at equal intervals on a rotary table 4 intermittently rotating around a specified axis. The table 4 intermittently rotates by a right angle by which each head 5 is arranged. Each head 5 is set to respectively stop at the component supply position 1a and a component mounting position 3a. Each head 5 has an attracting nozzle (not shown) capable of vertically moving, so that the nozzle moves downward at the component supply position 1a to attract the component from the unit 2, and thereafter moves upward, while the nozzle moves downward at the component mounting position 3a to release the attraction of the component and mounts the component on a circuit board as a component mounting member. After mounting the component thereon, the nozzle moves upward.

Reference numeral 6 denotes a positioning unit for positioning the board 10 on which the component is mounted. A fixing means 7 for firmly supporting at a specified position the board 10 supplied by a supply means (not shown) is arranged on an X-table 8 movable in the X direction of a rectangular coordinate system. The X-table 8 is arranged on a Y-table 9 movable in the Y direction of the rectangular coordinate system. Then, any component-mounting point, whereat the component is mounted on the board 10, firmly supported by the fixing means 7, can be positioned at the component mounting position 3a by the movements of the X-table 8 and the Y-table 9.

Figure 2:
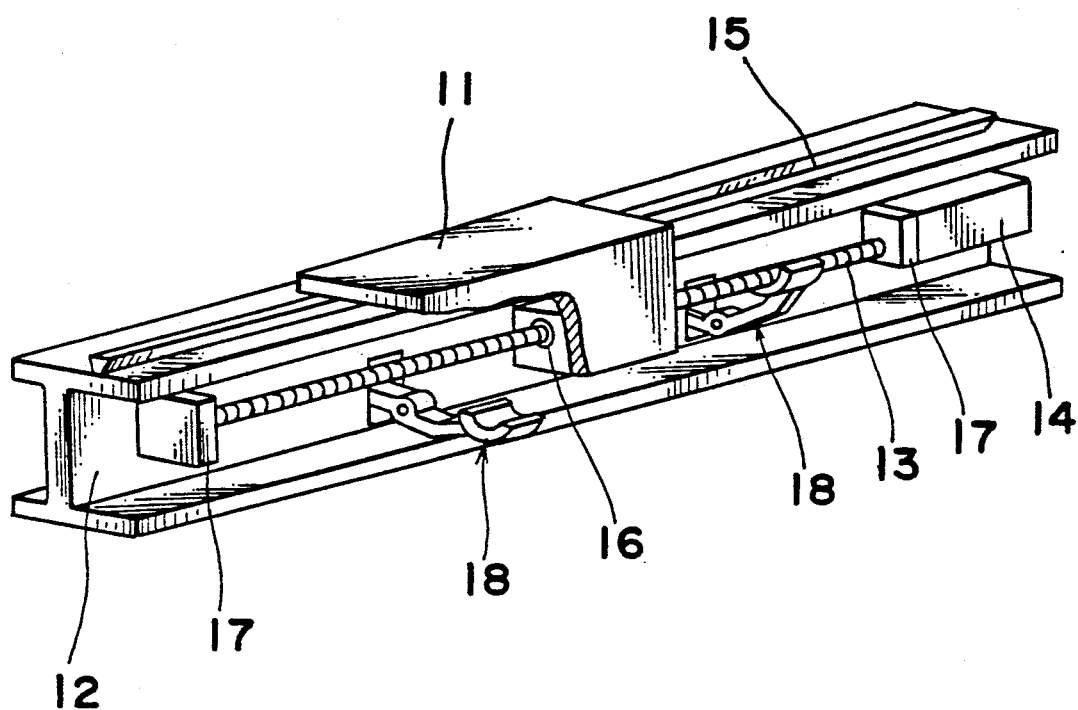
FIG. 2 is a perspective view showing a component supply section of the apparatus.

Next, the construction of the component supply section 1 will be described hereinafter, referring to FIG. 2.

The component supply units 2 are arranged in parallel on a movable table 11. The movable table 11 is movably supported on a linear guide 15 elongated along a guide frame 12 in a direction intersecting perpendicularly with the component supply direction of the component supply unit 2.

A ball screw 13 is arranged at one side of the guide frame 12 over approximately the entire length of the frame 12. Both ends of the ball screw 13 are rotatably supported by the guide frame 12 through bearings 17.

An output shaft of a motor 14 is firmly connected with one of the ends of the ball screw 13. The ball screw 13 is screwed into a nut 16 attached to the movable table 11.

Figure 3:
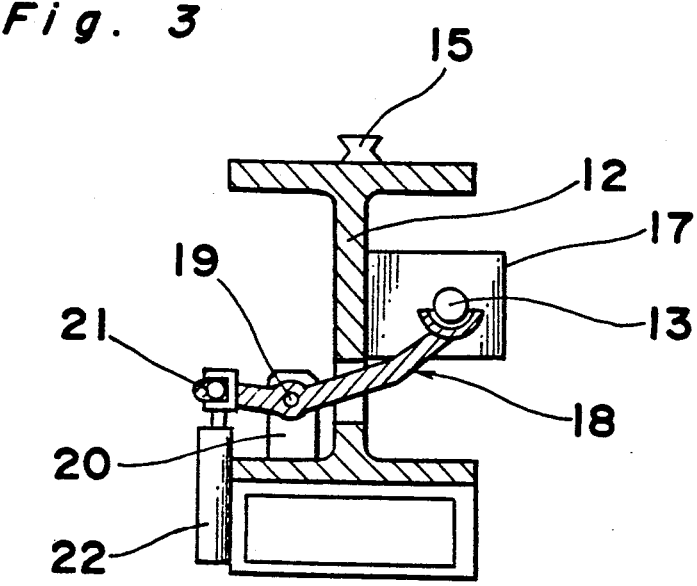
FIG. 3 is a partial longitudinal sectional view showing the component supply section.
Figure 4:
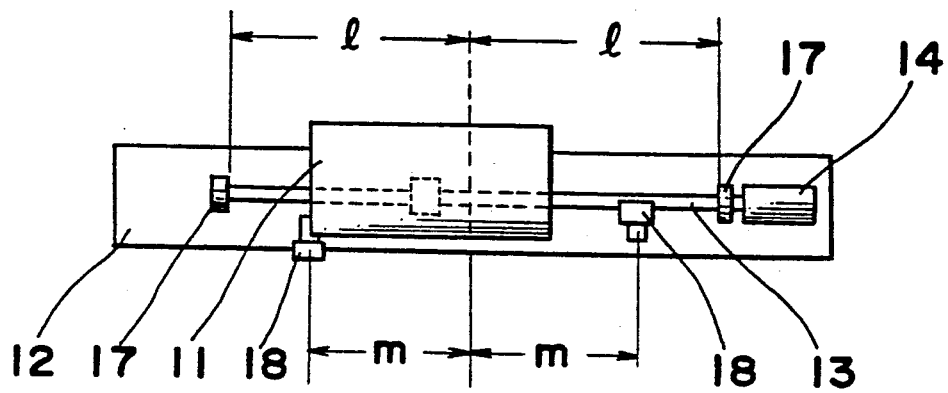
FIG. 4 is a rear view of the component supply section.

Two support levers 18 for preventing vibration of the ball screw 13 are arranged along the frame 12. As shown in FIG. 3, each of the levers 18 has a middle section supported by a pin 19 on a block 20 fixed to the frame 12 on the opposite side of the frame 12 to the ball screw 13. Each lever 18 can rotate around the pin 19 to move between a position for contacting with and supporting the ball screw 13 and a position for separating from the ball screw 13. A follower 21 is attached to the other end of each lever 18 and is connected with an approximately C-shaped end of an output rod of an air cylinder 22, so that the vertical movement of the rod of the cylinder 22 is changed to the rotary movement of the lever 18 around the pin 19. Each lever 18 is positioned at a position located a distance (m) from the center point of the ball screw 13 located a distance (l) from both the ends of the ball screw 13 as shown in FIG. 4. The levers 18 are thus equally spaced.

The operation thereof is as follows. The movable table 11 having the plural component supply units 2 accommodating various kinds of components moves along the linear guide 15, and then the unit 2 accommodating the components to be mounted is located at the component supply position 1a according to the predetermined mounting order. The component located at the component supply position 1a is attracted to the nozzle of the head 5 moved downward and located at the component supply position 1a. Then, the attracted component moves upward with the head 5. After the rotary table 4 rotates by a right angle and another component is attracted to another head 5, the rotary table 4 again rotates by a right angle to position the first head 5 attracting the component at the component mounting position 3a. Then the head 5 moves downward thereat toward the board 10, as described below. The board 10 moves in the X and Y directions by the positioning unit 6 to position the component-mounting position of the board 10 at the component mounting position 3a according to the component mounting order. Then, the component attracted by the head 5 moves downward with the head 5 and is mounted at the component-mounting position of the board 10 by the head 5. The mounting operation described above is sequentially repeated according to the movement of the component supply unit 2 and the rotation of the heads 5.

As shown in FIG. 4, during the movement of the movable table 11, one lever 18 is located at a position so as not to obstruct the movement of the movable table 11 and then rotates around the pin 19 by the upward movement of the rod of the cylinder 22 to contact with and upwardly support the ball screw 13 so as to prevent the vibration of the ball screw 13. Each lever 18 rotates by the operation of the corresponding cylinder 22 in synchronization with the timing of the movement of the movable table 11 according to the predetermined component mounting order.

According to the embodiment, even though the ball screw 13 with the large length is used as a driving shaft of the component supply section 1, the arrangement of the lever 18 capable of contacting with and separating from the ball screw 13 at the middle of the ball screw 13 allows the vibration of the ball screw 13 to be prevented during the movement of the movable table 11.

Figure 5:
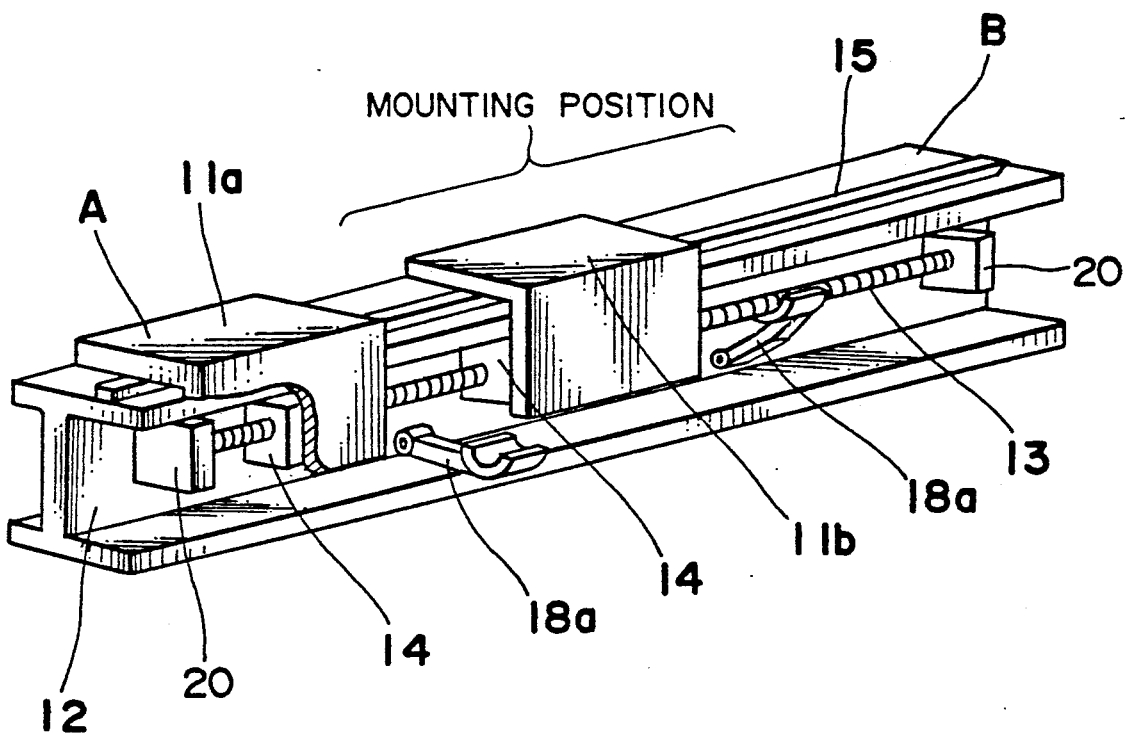
FIG. 5 is a perspective view of an electronic component mounting apparatus according to a second embodiment of the present invention.
Figure 6:
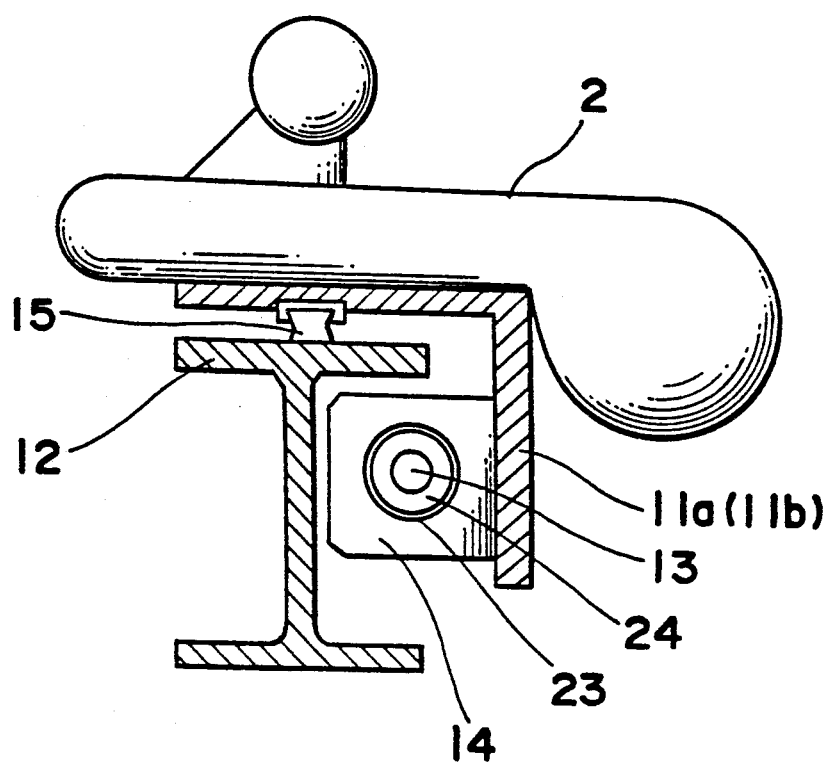
FIG. 6 is a longitudinal sectional view showing the component supply section.
Figure 7:
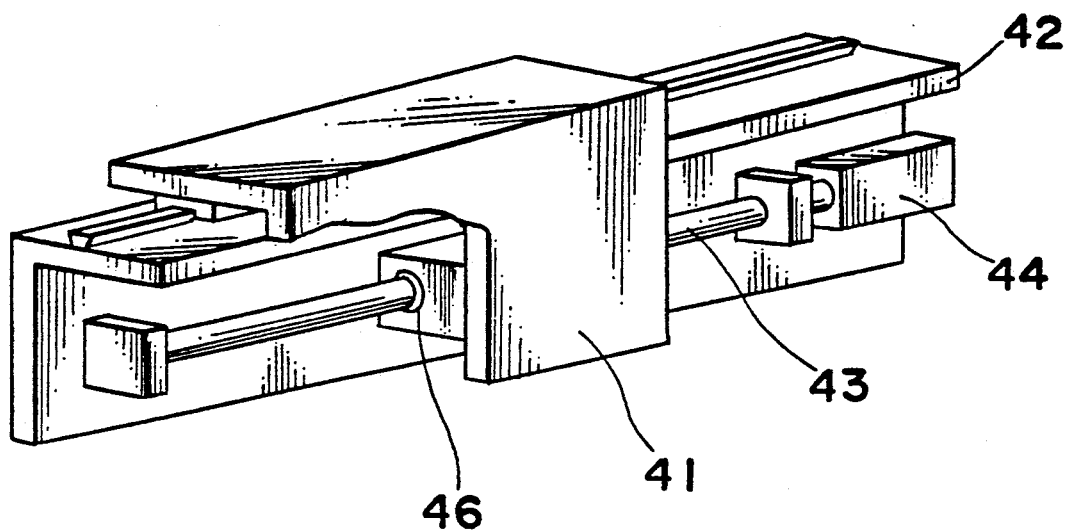
FIG. 7 is a perspective view showing a conventional electronic component mounting apparatus.

Referring to FIGS. 5 and 6, an electronic component mounting apparatus according to a second embodiment of the present invention will be described hereinafter.

FIG. 5 shows a component supply section of the apparatus. Plural component supply units 2 are respectively arranged in parallel on a pair of movable tables 11a and 11b. The movable tables 11a and 11b are supported by the guide frame 12 to be capable of moving along the guide frame 12. The guide frame 12 has a center having on both sides, along the longitudinal direction thereof a length corresponding to the sum of the lengths of the movable tables 11a and 11b and the center is opposed to the component supply position 1a. Anyone of the component supply units 2 on one of the movable tables 11a and 11b is located at the component supply position 1a, while the other of the movable tables 11a and 11b waits at the end of the guide frame 12.

The ball screw 13 is arranged at the side of the guide frame 12 over the approximately entire length of the guide frame 12. Both ends of the ball screw 13 are fixed to fixing brackets 20 as shown in FIG. 1. A nut 24 into which the ball screw 13 is screwed is arranged on each of the movable tables 11a and 11b and is fixed to an output shaft 23 of the motor 14 supported by each of the movable tables 11a and 11b and easily rotating.

The operation of the apparatus is as follows. Firstly, the plural component supply units 2 accommodating various kinds of the components to be mounted on the board 10 are set on one of the movable tables 11a and 11b. The other of the movable tables 11a and 11b waits at the end of the guide frame 12. The board 10 is supplied to the fixing means 7 of the positioning unit 6 by a supply means so that the board 10 is firmly supported at a specified position.

In this state, the movable table 11a moves along the guide frame 12 so that the component supply unit 2 accommodating the component to be mounted on the board 10 is sequentially positioned at the component supply position 1a according to the predetermined component mounting order. In this manner, after the component located at the component supply position 1a is held by the head 5 of the component mounting unit 3, the rotary table 4 rotates to move the component to the component mounting position 3a. On the other hand, the board 10 moves in the X and Y directions by the positioning unit 6 so that the component-mounting position of the board 10 is sequentially positioned at the component mounting position 3a, according to the predetermined component mounting order, to sequentially mount the component at the component-mounting position of the board 10.

During the mounting of the component by the movable table 11a, the component supply units 2 corresponding to the kind of board 10 to mounting the components in the following operation is set on the other of the movable table 11b. Then, after completion of the component mounting operation on the movable table 11a by the component supply units 2, the movable table 11a immediately moves to a waiting position and the movable table 11b which has waited, moves to the mounting position. Then the components are started to be mounted on the board 10 by the component supply units 2 on the movable table 11b.

A similar movable table changing operation described above can be performed in changing the kind of the board, as well as where the component in the component supply unit 2 on the movable table is insufficient for the mounting operation. In a case where many kinds of components are mounted on a circuit board 10 and the mounting order is limited, both the movable tables 11a and 11b can selectively move to mount the components during a series of component mounting operations.

When the movable table 11b moves to mount the component during the mounting operation as shown in FIG. 5, one of two levers, 18b contacts with and supports the ball screw 13 at a supporting position. The other of the levers, 18a, is separated from the ball screw 13 at a separating position. When the driving of the movable tables is changed and the other movable table 11a starts to move instead of the movable table 11b, the lever 18b rotates to the separating position to be separated from the ball screw 13. The movable table 11b moves from a mounting position as shown in FIG. 5 to a waiting position B, while the movable table 11a moves from a waiting position A to a mounting position and the lever 18a contacts with and supports the ball screw 13.

According to the embodiment, when the components are mounted on the board 10 by the plural movable tables 11a and 11b, at least one of the levers 18a and 18b can continuously support the ball screw 13 during the movement of one of the movable tables 11a and 11b for mounting by switching the levers 18a and 18b in replacing the movable tables. The nut 24 is driven by the motor 14 and the ball screw 13 is supported by the brackets 20 located at both the ends of the guide frame 12, resulting in a simple vibration damping of the ball screw 13 by the levers 18a and 18b.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An electronic component mounting apparatus, comprising:
    a movable table having a plurality of component supply units disposed thereon in parallel for supplying components in a component supply direction, each said component supply unit accommodating an electronic component to be mounted on a component mounting member;
    a guide frame supporting said movable table for movement in a direction perpendicular to said component supply direction of said component supply units;
    a driving shaft extending in said direction perpendicular to said component supply direction, supported at opposite ends thereof and connected to said movable table for moving said movable table on said guide frame;
    a positioning means for positioning a component mounting member for mounting of components thereto;
    a component mounting means for holding components from said component supply units and mounting the components on a component mounting member; and
    a support member for supporting said driving shaft at a point between said opposite ends thereof, said supporting member being movable between a position contacting and supporting said driving shaft and a position separated from said driving shaft to allow movement of said table without interference by said support member.

2. The apparatus of claim 1, wherein said driving shaft is a ball screw driven by a motor disposed on said guide frame and said table has a nut fixed thereto engaged with said ball screw.

3. The apparatus of claim 1, wherein said driving shaft is a ball screw and said table has a nut driven by a motor on said table engaged with said ball screw.

4. The apparatus of claim 1, wherein:
    said drive shaft is mounted on said guide frame; and
    said support member comprises a pivot member pivoted on said guide frame and a cylinder for pivoting said pivot member.

5. The apparatus of claim 1, and further comprising a second support member for supporting said driving shaft at a second point between said opposite ends thereof, said second support member being movable between a position contacting and supporting said driving shaft and a position separated from said driving shaft to allow movement of said table without interference by said support member.

* * * * *